Jan. 13, 1959  R. J. ANDERSON  2,868,324
VENT LINE CENTRIFUGE

Filed Dec. 5, 1955

INVENTOR.
ROBERT J. ANDERSON
BY
ATTORNEYS

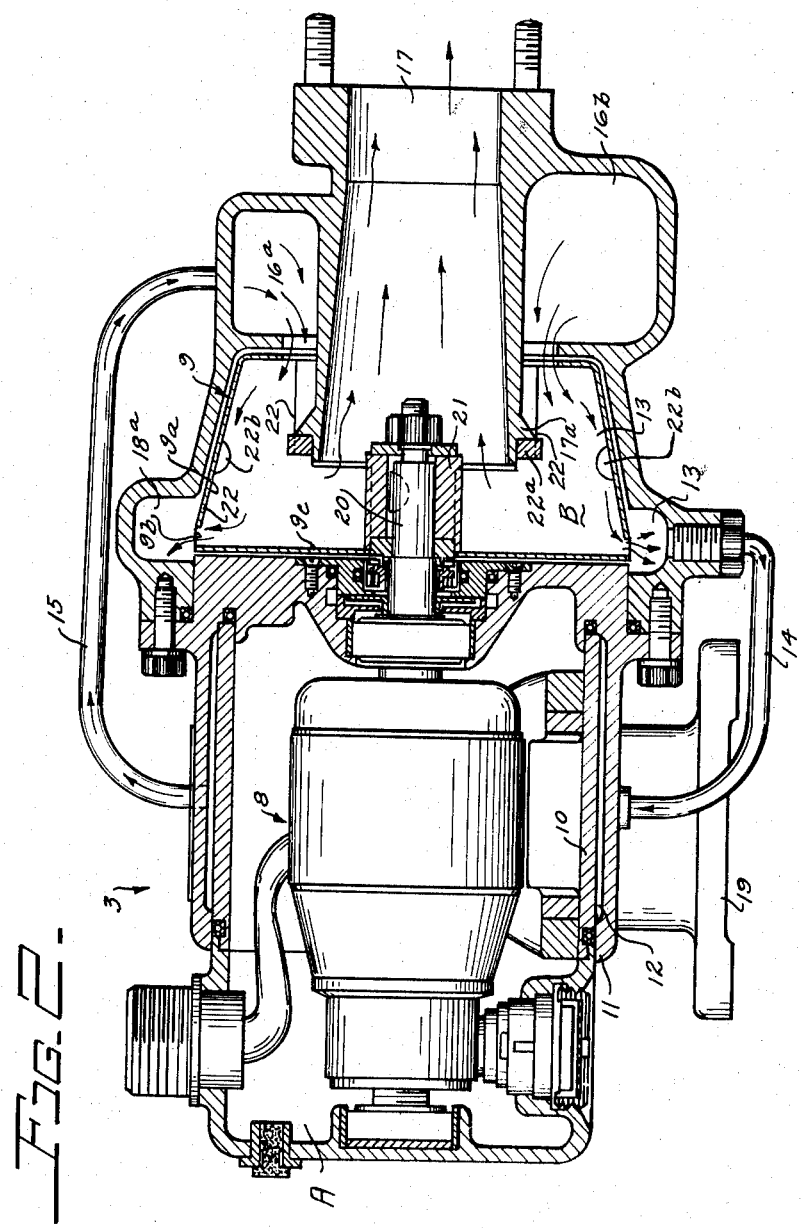

Jan. 13, 1959  R. J. ANDERSON  2,868,324
VENT LINE CENTRIFUGE
Filed Dec. 5, 1955  3 Sheets-Sheet 3
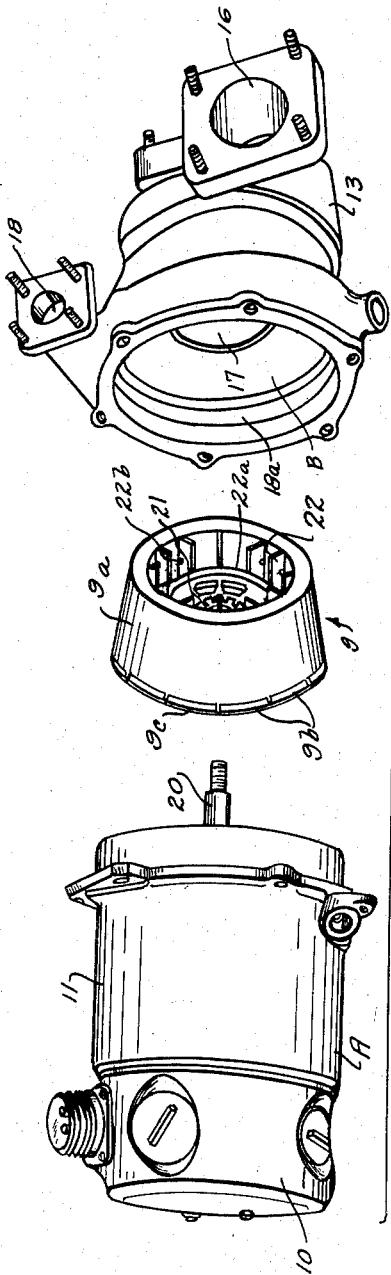
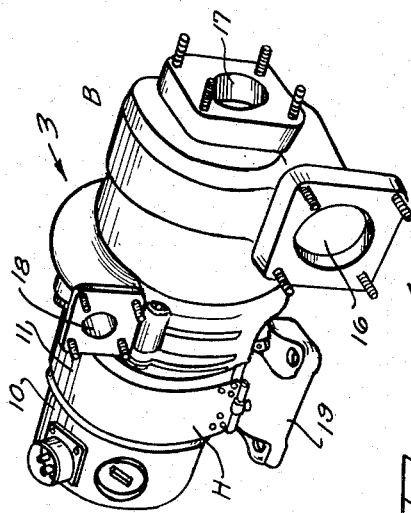
INVENTOR.
ROBERT J. ANDERSON
BY
ATTORNEYS United States Patent Office 2,868,324
Patented Jan. 13, 1959

2,868,324

VENT LINE CENTRIFUGE

Robert J. Anderson, Wickliffe, Ohio, assignor to the United States of America as represented by the Secretary of the Air Force Application December 5, 1955, Serial No. 551,184

5 Claims. (Cl. 183—77)

This invention relates to a simple means for effecting a reduction in the loss of fuel that normally occurs in high speed aircraft where rapid depressurization of fuel in the fuel tank takes place during rapid rates of climb to high altitudes.

A further object of the invention is the utilization of a means for substantially eliminating the loss of an entrained liquid fuel in an aircraft fuel system which is combined with vapor fuel caused by rapid depressurization in the aircraft fuel tank.

A still further object of the invention is the provision of means for the separation of entrained liquid fuel from the vapor fuel and its return under pressure to the fuel tank.

Another object of the invention is the provision of a centrifuge in the aircraft fuel tank vent line for the separation and return of entrained liquid initially in mixture with fuel vapor.

It has been determined that "overboard" fuel losses on some high speed aircraft exceeded 8% of the total fuel weight and represents a considerable loss in aircraft performance. This loss of fuel occurs as a result of the rapid depressurization of the aircraft fuel tanks during rapid rates of climb to high altitude and consists of vapor and entrained liquid which pass through the tank vent lines. Insofar as the vapor is concerned, this loss is inescapable due to high initial vapor pressures as compared to the altitude to which the aircraft may climb; however, in regard to the entrained liquid in the vapor this can be recovered and returned to the fuel tanks.

It is a particular object of this invention, therefore, to incorporate means such as a power driven centrifuge in the vent line of the aircraft fuel tank by which the entrained liquid fuel in the vapor is separated from the vapor fuel and returned under pressure to said fuel tanks.

Other objects and advantages of the invention will become apparent from the following description, taken in connection with the accompanying drawings, in which like reference characters refer to like parts in the several figures.

Fig. 2 is a longitudinal sectional view of the centrifuge illustrated in Fig. 1.

Fig. 3 is an exploded view of the main parts of the centrifuge shown in Fig. 2.

Fig. 4 is a view of the assembled unit.

Figure 1:
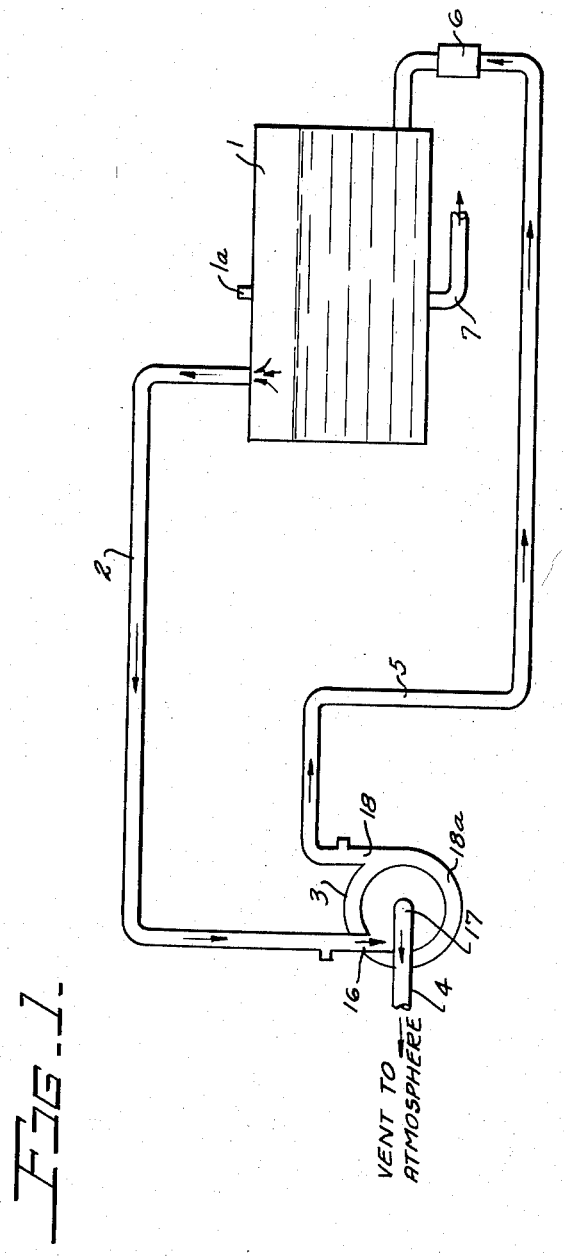
Fig. 1 is a schematic view of an installation such as may be employed in carrying out the invention.

Referring more particularly to Fig. 1 of the drawings, there is schematically illustrated an improved system comprising an aircraft fuel tank 1 having a filler opening 1a, the fuel tank vent line 2, a centrifuge 3, a second vent line 4, and a return line 5. A pressure regulator and a fuel feed line to the aircraft engine are indicated at 6 and 7, respectively.

The centrifuge 3 illustrated in detail in Fig. 2 is located in the vent line of the system as shown schematically in Fig. 1 and consists of two main chambers, A and B, the former housing a motor 8 and the latter housing a rotor 9 which is supported and driven by said motor, the chamber B being known as the centrifuge chamber. The two chambers are separable from each other and are held together by six bolt fasteners as shown. The rotor 9 (see Fig. 3) comprises a plurality of blades 22 which are substantially U-shaped and apertured to permit passage of liquid fuel during the rotation thereof. The motor frame 10 is surrounded by an annular member 11 (note Fig. 2) providing a passage 12 for cooling by means of fuel bled from the centrifuge chamber at 13 through line 14 to said passage 12 and then bled back to the centrifuge chamber 13 by a line 15. When the centrifuge is not handling fuel, the load is at a minimum and no cooling is required. The centrifuge further includes a number of openings, first a relatively large opening at 16 connecting with a volute passage 16b of gradually decreasing cross-section to make a compact and practical design, second a center opening 17 for passage of the separated vapor fuel, and, third, a smaller peripheral opening 18 for passage of the separated liquid fuel. The volute passage 16b in addition incorporates a continuous opening 16a disposed in its inner wall in communication with the centrifuge chamber B. The centrifuge 3 in addition includes a base 19 to mount the same to an appropriate part of the aircraft structure. The drive mechanism 8 may be a 27 volt D. C. motor which drives and supports the rotor 9 through means of the motor shaft 20. The rotor 9 which telescopically fits into the chamber B as illustrated in the exploded view of Fig. 3 and in Fig. 2 comprises an exterior shell 9a in the form of a truncated-cone, a peripheral wall member 9c, and a bearing or hub member 21 into which the shaft 20 fits. A plurality of blades 22 are spaced as shown in Fig. 3 around the inside wall of the exterior shell 9a of said rotor and are adjacent the right hand end of the rotor as seen in Fig. 3. The entrained liquid of the mixture of vapor and liquid fuel collects along the inside walls of the exterior shell 9a of said rotor 9 where it is pumped out the peripheral passage 9b at the largest diameter of the rotor which is the left hand side thereof as seen in Figs. 2 and 3.

The center opening 17 is flared inwardly towards the interior of chamber B and includes an angular exterior flange 17a cooperating with annular ring 22a carried on the rotor blades 22. Said blades 22 are notched at 22b to equalize the flow of entrained liquid between the blades.

To summarize the operation of the vent line centrifuge, the aircraft fuel tank 1 during and after the supporting airplane climbs to higher altitudes vents a mixture of vapor fuel and entrained liquid fuel out the first vent line 2 from whence it passes through the large opening 16 into the gradually decreasing cross-section of centrifuge volute passage 16b where it enters into centrifuge chamber B through opening 16a and is acted on by blades 22 of the rotor 9 which apply centrifugal force to said vapor and entrained liquid fuel mixture. This centrifugal force coupled with a sudden reversal in direction of 180° causes the heavier density liquid fuel to separate from the vapor fuel, collect along the inside peripheral wall of said rotor 9, and continue to flow towards the larger diameter of the rotor where it is directed out the peripheral passage 9b into the peripheral channel 18a and peripheral opening 18 to the second vent line 5 where it is returned under pressure to the fuel tank 1 through the pressure regulator 6. The separated vapor fuel completes its 180° turn and because it is of lighter density it has separated from the entrained liquid and leaves the centrifuge chamber by way of the center opening 17 and the second vent line 4.

Thus, it has been determined that the application of the specific centrifuge described above to the vent line of an aircraft fuel tank results in a return to the fuel in excess of 98% of the total entrained liquid fuel, normally lost with the vapor fuel vented to the atmosphere.

I claim:

1. Apparatus for the separation of liquid from a mixture of entrained liquid and vapor comprising a centrifuge having an inlet adapted to receive the mixture; a volute having a gradually decreasing cross-section spiral passage in communication with said inlet imparting a rapid change of direction to the mixture, a centrifuge chamber adjacent to and in communication with said volute, a relatively large, central outlet having an inwardly flared open end in communication with the interior of the centrifuge chamber and adapted to vent separated vapor therefrom and a relatively restricted, peripherally disposed outlet adapted to pass separated liquid from the centrifuge chamber, and a truncated-conical, hollow rotor rotatably and telescopically positioned in the centrifuge chamber having a relatively narrow open end in communication with said volute to receive and apply centrifugal force on the mixture to separate the liquid therefrom and an opposite, relatively enlarged closed end incorporating a peripherally disposed passageway in communication with said restricted, peripherally disposed outlet and a peripheral channel incorporated in said centrifuge in communication between the peripherally disposed passageway and said peripherally disposed outlet and transferring the separated liquid being pumped rearwardly towards said relatively enlarged closed end to said last-named outlet.

2. A centrifuge comprising a casing forming a chamber, a power-driven hollow rotor rotatably and telescopically positioned in said chamber having a first, relatively narrow open end and a second relatively enlarged, opposite closed end, a plurality of blades affixed to and interiorly of said rotor extending the full length thereof inwardly towards the center of said chamber and incorporating a plurality of perforations at predetermined points to provide even flow of separated liquid along the walls of said rotor towards the second, relatively enlarged closed end thereof, said rotor being outwardly flared towards said relatively enlarged closed end to provide a larger diameter thereat, a relatively large inlet incorporated in said casing for admission of a mixture of liquid and vapor positioned transverse to the longitudinal axis of said casing, a first, relatively small peripheral outlet disposed in said casing for the exhaust of separated liquid on the periphery of said casing in a direction directly opposite to that of the admission of said mixture in said inlet in open communication with the enlarged end of said rotor, and a second, relatively enlarged centrally disposed outlet communicating with the interior of said chamber and extending transversely of said inlet and outlet for exhausting separated vapor from said chamber, said centrally disposed outlet having an inwardly flared end extending towards the interior of said chamber and having an angular flange cooperating with said plurality of blades.

3. A centrifuge for separating entrained liquid from a mixture of vapor and liquid comprising a main body inclosing a centrifuge chamber, a rotor telescopically positioned in said chamber comprising a truncated-conical exterior shell, an inside peripheral wall member and a plurality of blades circumferentially spaced around the inside wall of said exterior shell, said main body having a central conduit extending longitudinally of and in communication with said chamber and having an inwardly flared open end portion extending towards the interior of said chamber, an annular ring carried on said blades, an angular exterior flange on said flared portion cooperating with and supporting said annular ring in sealed relation, each of said plurality of blades incorporating a notch adjacent the interior wall of said rotor to equalize the flow of separated entrained liquid between said blades, a spirally arranged inlet conduit having a progressively decreasing cross-section leading into said chamber to effect a sudden reversal in the direction of flow of said mixture substantially simultaneous with action thereon by the plurality of blades of said rotor to separate said entrained liquid from said mixture, the remaining separated vapor of said mixture completing its reversal of direction to pass out of said chamber through said central conduit, said separated entrained liquid collecting along said inside peripheral wall member of said rotor, said rotor having an intercommunicating peripherally disposed channel in communication with said wall member and a restricted outlet in communication with the peripherally disposed channel of said rotor passing said separated entrained liquid out of said chamber.

4. In a centrifuge for separating relatively dense liquid from relatively light vapor and adapted to return said liquid under pressure to a source of supply, a main body housing a chamber, an inlet in said body adapted to receive a mixture of liquid and vapor, spiral casing means opening into said chamber and interconnected with said inlet for directing the mixture received thereat into said chamber after imparting a spiral motion thereto, an outlet in said body in communication with said chamber remote from said spiral casing, rotatably mounted means telescopically positioned in said casing having a plurality of integrally mounted, interiorly disposed fins for receiving and applying a rotary motion to said mixture substantially reversing the direction of flow of the relatively light vapor simultaneous with an initial change in direction of flow of the heavier relatively dense liquid initially outwardly towards the inner circumference walls of said rotatably mounted means and subsequently pumped rearwardly towards said outlet, and a second outlet in said body in communicating alignment with the axis of said rotatably mounted means remote from and transverse to said first-named outlet for receiving said separated vapor, said rotatably mounted means consisting of a truncated cone rotor and said integrally mounted fins consisting of a plurality of substantially U-shaped rotor elements affixed to the interior wall of said rotor and each incorporating a notch adjacent the juncture thereof to said rotor wall to direct flow of separated liquid on opposite sides of each of said rotor elements.

5. In a centrifuge for separating entrained liquid from a mixture of liquid and vapor, a centrifuge chamber, a volute having a spiral passage and a relatively large inlet admitting the mixture into said centrifuge chamber, a truncated-cone shaped rotor telescopically positioned in said centrifuge chamber, said spiral passage including intermediate liquid-vapor inlet means admitting said mixture into said centrifuge chamber in a direction parallel to the longitudinal axis of said rotor, a central vapor exhaust outlet in communication with said centrifuge chamber and extending at right angles to the plane of said relatively large inlet exhausting separated vapor from said centrifuge chamber, and a relatively small peripheral liquid exhaust outlet in communication with said centrifuge chamber remote from said inlet exhausting separated liquid from said centrifuge chamber in a direction opposite to that admitted into said relatively large inlet, said rotor comprising an exterior shell, a peripheral wall member, a bearing member about which said rotor rotates and a plurality of blades circumferentially spaced around the inside of said exterior shell, said blades being notched at their juncture to said exterior shell to equalize the flow of separated liquid therebetween and extending in surrounding relation to said bearing member rearwardly of said vapor exhaust outlet to apply continuous separating action on said mixture, the flow of vapor being completely reversed by said plurality of blades and the flow of liquid being forced outwardly under action of centrifugal force towards the walls of said exterior shell to completely separate therefrom, said vapor exhaust outlet being flared inwardly towards the interior of said centrifuge chamber to receive and exhaust the separated vapor subsequent to its reversal of flow under action of said plurality of blades and having an angular flange at its inwardly flared portion cooperating in sealing contact relation with an annular ring and said plurality of blades, said peripheral wall member forming a peripheral passage in communication with said relatively small peripheral liquid exhaust outlet and receiving the separated liquid pumped rearwardly along the inside walls of said rotor.

References Cited in the file of this patent

UNITED STATES PATENTS

| | | |
|---|---|---|
| 775,462 | Steinbart | Nov. 22, 1904 |
| 881,723 | Scheibe | Mar. 10, 1908 |
| 1,532,118 | Bayles | Apr. 7, 1925 |
| 1,799,590 | Kiefer | Apr. 7, 1931 |
| 1,847,648 | Harkom | Mar. 1, 1932 |
| 2,147,993 | Scheibe | Feb. 21, 1939 |

FOREIGN PATENTS

| | | |
|---|---|---|
| 570,729 | Germany | Feb. 20, 1933 |
| 713,808 | Germany | Nov. 15, 1941 |
| 536,906 | Great Britain | May 30, 1941 |
| 279,901 | Switzerland | Apr. 1, 1952 |